(12) United States Patent
Liu et al.

(10) Patent No.: US 10,664,374 B2
(45) Date of Patent: May 26, 2020

(54) EVENT ANALYSIS DEVICE, EVENT ANALYSIS SYSTEM, EVENT ANALYSIS METHOD, AND EVENT ANALYSIS PROGRAM

(71) Applicant: YOKOGAWA ELECTRIC CORPORATION, Tokyo (JP)

(72) Inventors: Zhuo Liu, Tokyo (JP); Yuichi Sakuraba, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 457 days.

(21) Appl. No.: 15/330,778

(22) Filed: Nov. 7, 2016

(65) Prior Publication Data

US 2017/0132104 A1    May 11, 2017

(30) Foreign Application Priority Data

Nov. 9, 2015 (JP) .................................. 2015-219833

(51) Int. Cl.
*G06F 17/30* (2006.01)
*G06F 7/00* (2006.01)
(Continued)

(52) U.S. Cl.
CPC ...... *G06F 11/3006* (2013.01); *G05B 23/0237* (2013.01); *G06F 11/323* (2013.01);
(Continued)

(58) Field of Classification Search
CPC ............ G06F 11/3476; G06F 11/3006; G06F 11/3438; G06F 17/30315; G06F 17/30598;
(Continued)

(56) References Cited

U.S. PATENT DOCUMENTS 5,819,094 A * 10/1998 Sato ...................... G06F 11/323
717/131
6,100,940 A * 8/2000 Dieterich ............. H04N 19/198
348/700
(Continued)

FOREIGN PATENT DOCUMENTS

JP    2013-020426 A    1/2013

OTHER PUBLICATIONS

Kenji Kataoka et al., "Implementation of Operator Support System using Dynamic Simulator for Abnormal Plant Condition", International Conference on Computational Intelligence for Modelling Control and Automation, and International Conference on Intelligent Agents, Web Technologies and Internet Commerce, 2006, (total 6 pages).

*Primary Examiner* — Hasanul Mobin
(74) *Attorney, Agent, or Firm* — Sughrue Mion, PLLC

(57) ABSTRACT

An event analysis device having an event collector for collecting event log data representing an operation history by a DCS operator; an event analyzer for analyzing the event log data, and extracting basic unit operations or unit operations representing an operation method based on operations of the DCS operator or an operation intention based on operations of the DCS operator; an operation sequence extractor for extracting operation sequences which the basic unit operations or the unit operations are aligned in accordance with time order in every service time period; an operation clusterer for clustering the operation sequences based on similarity among the operation sequences extracted in every service time period; and an operation procedure generator for analyzing the operation sequences clustered in same type, and estimating a structure of the operation procedure based on the operation of the DCS operator.

12 Claims, 13 Drawing Sheets

(51) Int. Cl.
*G06F 11/30* (2006.01)
*G06F 16/22* (2019.01)
*G06F 16/28* (2019.01)
*G05B 23/02* (2006.01)
*G06F 11/32* (2006.01)
*G06F 11/34* (2006.01)
*G05B 19/042* (2006.01)
*G05B 15/02* (2006.01)

(52) U.S. Cl.
CPC ...... *G06F 11/3438* (2013.01); *G06F 11/3476* (2013.01); *G06F 16/221* (2019.01); *G06F 16/285* (2019.01); *G05B 15/02* (2013.01); *G05B 19/0426* (2013.01); *G05B 2219/23026* (2013.01); *G05B 2219/23434* (2013.01); *G05B 2219/35291* (2013.01)

(58) Field of Classification Search
CPC . G06F 16/285; G06F 16/221; G05B 19/0426; G05B 23/0237; G05B 15/02; G05B 2219/35291
See application file for complete search history.

(56) References Cited

U.S. PATENT DOCUMENTS

| | | | |
|---|---|---|---|
| 2003/0005393 A1* | 1/2003 | Kawamoto | G06F 17/5022 716/103 |
| 2005/0246161 A1* | 11/2005 | Sakurai | G06Q 30/02 704/10 |
| 2006/0095150 A1* | 5/2006 | Inoue | G05B 23/0267 700/95 |
| 2007/0011195 A1* | 1/2007 | Kutsumi | G06Q 30/02 |
| 2007/0050070 A1* | 3/2007 | Strain | G06Q 10/06 700/99 |
| 2007/0239792 A1* | 10/2007 | Chen | G06F 16/313 |
| 2010/0007483 A1* | 1/2010 | Oh | H04L 67/36 340/521 |
| 2010/0026511 A1* | 2/2010 | Akao | G06F 11/0751 714/26 |
| 2012/0271587 A1* | 10/2012 | Shibuya | G05B 23/0229 702/127 |
| 2014/0188779 A1* | 7/2014 | Sakuraba | G05B 23/0275 706/52 |
| 2014/0317040 A1* | 10/2014 | Liu | G06K 9/6296 706/46 |
| 2015/0127876 A1* | 5/2015 | Erni | G05B 19/4185 710/315 |

* cited by examiner

FIG. 2

| EVENT ID | TIME AND DATE | TAG NAME | OPERATION TYPE | PREVIOUS VALUE | CURRENT VALUE |
|---|---|---|---|---|---|
| 1 | 2015/8/21 10:00:00 | TAG1 | MAN | AUT | MAN |
| 2 | 2015/8/21 10:00:10 | TAG1 | MV | 25.0 | 30.0 |
| 3 | 2015/8/21 10:00:30 | TAG1 | MV | 30.0 | 35.0 |
| 4 | 2015/8/21 10:00:50 | TAG2 | SV | 91.0 | 89.0 |
| 5 | 2015/8/21 10:01:00 | TAG1 | MV | 35.0 | 40.0 |
| 6 | 2015/8/21 10:02:50 | TAG2 | SV | 89.0 | 90.0 |
| 7 | 2015/8/21 10:03:00 | TAG1 | AUT | MAN | AUT |
| 8 | 2015/8/21 10:03:01 | TAG1 | SV | 2.0 | 3.0 |
| ⋮ | ⋮ | ⋮ | ⋮ | ⋮ | ⋮ |

FIG. 3

| BASIC UNIT OPERATION ID | STARTING DATE AND TIME | ENDING DATE AND TIME | TAG NAME | OPERATION TYPE | OPERATION METHOD | EVENT ID |
|---|---|---|---|---|---|---|
| No. 1 | 2015/8/21 10:00:00 | 2015/8/21 10:00:00 | TAG1 | MAN | MODE CHANGE | No. 1 |
| No. 2 | 2015/8/21 10:00:10 | 2015/8/21 10:01:00 | TAG1 | MV | RAMPING + | No. 2, No. 3, No. 5 |
| No. 3 | 2015/8/21 10:00:50 | 2015/8/21 10:02:50 | TAG2 | SV | FINE-TUNING | No. 4, No. 6 |
| No. 4 | 2015/8/21 10:03:00 | 2015/8/21 10:03:00 | TAG1 | AUT | MODE CHANGE | No. 7 |
| No. 5 | 2015/8/21 10:03:01 | 2015/8/21 10:03:01 | TAG1 | SV | SETTING CHANGE + | No. 8 |
| ... | ... | ... | ... | ... | ... | ... |

FIG. 4

| UNIT OPERATION ID | STARTING DATE AND TIME | ENDING DATE AND TIME | TAG NAME | OPERATION INTENTION | BASIC UNIT OPERATION ID |
|---|---|---|---|---|---|
| No. 1 | 2015/8/21 10:00:10 | 2015/8/21 10:03:01 | TAG1 | FLOW AMOUNT INCREASE | No. 1, No. 2, No. 4, No. 5 |
| No. 2 | 2015/8/21 10:00:50 | 2015/8/21 10:02:50 | TAG2 | TEMPERATURE FINE-TUNING | No. 3 |
| ... | ... | ... | ... | ... | ... |

EVENT ANALYSIS DEVICE, EVENT ANALYSIS SYSTEM, EVENT ANALYSIS METHOD, AND EVENT ANALYSIS PROGRAM

BACKGROUND OF THE INVENTION

Field of the Invention

The present invention relates to an event analysis device, an event analysis system, an event analysis method, and an event analysis program.

Priority is claimed on Japanese Patent Application No. 2015-219833, filed Nov. 9, 2015, the contents of which are incorporated herein by reference.

Description of Related Art

A control system such as DCS (Distributed Control System) may often record an event log of an operation by a DCS operator as an event log. Not only an operation history but also histories of guidance may be recorded in the event log. The user of the control system improves the control system which the DCS operator operated, by analyzing examples of efficiently performed operation, with reference to the past event log. An event analysis device may be used for the analysis of the event log.

FIG. 13 is a block diagram showing a configuration of a prior event analysis system 7 and an event analysis device 70. As shown in FIG. 13, the event analysis system 7 includes the event analysis device 70, an event log database 71, a display 78, a control system 79, and a historian 80. Further, as shown in FIG. 13, the event analysis device 70 includes an event collector 701, an event analyzer 703, and an analysis result output unit 711.

The event collector 701 collects the event log from at least one of the control system 79 and the historian 80, and records the event log in the event log database 71. That is, the event collector 701 collects the event log from the event log data manager manages the event log data, and records the event log in the event log database 71. The event analyzer 703, in response to a user's request, accesses the event log database 71 and searches the event log that matched the specified conditions. The event analyzer 703 performs the analysis processing, such as the cluster analysis of the event and the counting of the number of the events, based on the searched event log. The analysis result output unit 711 visualizes an illustration such as an operation event list based on the analysis result of the event log and tables and graphs showing the result of the statistical processing of the event log to display on the display 78. Thus, the user can utilize an event analyzer 70 to specify a period and a device name to refer the operation event sequences listed up in chronological order. For example, if a user focuses on specific service, and specifies the period during which the service has been carried out in the past, all of the events within the specified period are listed up in chronological order.

By the way, the operation of such plants is often automated, some operations are operated manually by the DCS operator such as an unsteady behavior and a troubleshooting. Typically, such a manual operation is performed according to the description contents of a SOP (Standard Operation Procedure). Incidentally, conventionally, new creation and improvement of the SOP has been carried out by analyzing the event log stored in the DCS and historian. Since the operation method of the plant is changed over time, a description content of the SOP also needs to be updated in response to changes in the operating method. Also, as for the processing for the trouble which has not been assumed at the time of launch of the plant, it is desirable that the SOP is newly created, for the process of the SOP does not exist.

Furthermore, in some of the SOP, the operation procedures are roughly described and the specific instructions are not described. Thus, when the DCS operator operates the plant using the SOP that describes only rough operation procedures, it may respectively be different interpretation of the SOP by the DCS operator. As a result, the variation occurs in the operation by the DCS operator. Therefore, it is desirable that the concrete operation method is described in the SOP, and varied operation procedures are standardized (common).

When using the conventional event analyzer, although it is possible to extract the operation record of an individual event log unit from the enormous amount of the event log, it is difficult to extract manually the rough operation method and an operation intention of the operation by the DCS operator (i.e., information regarding more abstract operation contents). Further, even if it is able to extract the operation record of an individual event log unit, since the operation represented by the operation record and the operation illustrated in the SOP are difference in the degree of abstract, it is difficult to compare the two operations directly. For example, when the gradual changing of a SV (Set the Variable) of a target device to the specified value is described in the SOP, the changing operation of the SV may be often performed over a plurality of times (ramping operation). In this case, in the event log, the operation recordings in multiple times are recorded individually as an event log. It may be difficult to compare the individual operation record and the operation described in the SOP.

Therefore, in order to correspond to the event log with the operation described in the SOP, it is necessary to analyze the event log. The plant operation support system described in Patent Document 1 (Japanese Patent Application Publication No. 2013-020426) holds the SOP described in the same data format with the event log. By the description of the event log and the SOP is unified in the same data format, the contrast between the individual operation records and the operation described in the SOP (in the case, the SOP is written at a fine operation unit and in the low abstraction level) is facilitated.

However, in the plant operation support system described in Patent Reference 1, it does not describe differences between abstractions described above. That comparison between the operation record (event log) and the description of the SOP in units of the event log is facilitated by the invention described in Patent Document 1, it is still difficult that the DCS operator grasps the correspondence between the operation record and the description of the SOP (i.e., the highly abstracted SOP) representing the operation method of the DCS operator and the operation intention.

Further, since the operation procedures are respectively different depending on the differences of the DCS operator and the external condition, even when the operation is restricted to the analysis target operation, there are a plurality of operation procedures. In addition, since the number of operation at the ramping is different each time of the ramping, it is difficult to grasp the correspondence relationship between the operation record (event log) and the description of the SOP representing the operation method of the DCS operator and the operation intention. Further, in the prior art, since the parallel operations such that a plurality of operations are performed in parallel (operation which may performed in parallel) are not considered, it is difficult for the DCS operator to grasp the correspondence relationship between the operation record regarding the operation including the parallel operation and the SOP. Thus, in the prior art, it is difficult to estimate, for example, a structure of the operation procedure, the general flow of the operation procedure, and the probability (frequency) which each operation included in the operation procedure (component of the operation procedure) is performed.

The present invention provides the event analysis device, the event analysis system, the event analysis method, and the event analysis program, capable of estimating the structure of the operation procedure of the DCS operator.

SUMMARY (1) Some embodiments of the present invention provide an event analyzer. The event analysis device includes: a one or more operation sequence collector configured to collect event log data representing an operation history by a DCS operator; an event analyzer configured to analyze event log data, and to extract one or more basic unit operations or one or more unit operations representing an operation method based on operations of the DCS operator or an operation intention based on operations of the DCS operator; an operation sequence extractor configured to extract one or more operation sequences which the one or more basic unit operations or the one or more unit operations are aligned in accordance with time order in every service time period; an operation sequence clusterer configured to cluster the operation sequences based on similarity among the operation sequences extracted in every service time period; and an operation procedure generator configured to analyze the operation sequences clustered in same type, and to estimate a structure of the operation procedure based on the operation of the DCS operator.

(2) Furthermore, in the event analysis device described above, the operation procedure generator is configured to extract the one or more basic unit operations or the one or more unit operations configured to the operation sequences, and to estimate the structure regarding sequential characteristics or parallel characteristics among the one or more basic unit operations or the one or more unit operations, order among the one or more basic unit operations or the one or more unit operations, and branch to the one or more basic unit operations or the one or more unit operations.

(3) Furthermore, in the event analysis device described above, the operation procedure generator is configured to set determination rule based on domain knowledge of the one or more plant operations, and to estimate the structure regarding sequential characteristics or parallel characteristics among the one or more basic unit operations or the one or more unit operations based on the determination rule.

(4) Furthermore, in the event analysis device described above, the operation procedure generator is configured to align at least one or more of same types of the one or more basic unit operations or the one or more unit operations included in the operation sequences mutually belong in same time order to a plurality of the operation sequences clustered in the same type, and to estimate the structure regarding the order among the one or more basic unit operations or the one or more unit operations.

(5) Furthermore, in the event analysis device described above, the operation procedure generator is configured to determine a connected relation among the basic unit operations or the unit operations included in the operation sequences in the time orders which are mutually different from each other, and to obtain a transition probability among the basic unit operations or the unit operations in the time orders which are mutually different from each other.

(6) Furthermore, the event analysis device described above further includes an operation procedure output unit configured to generate an illustration that visualized the structure of the operation procedure.

(7) Furthermore, the event analysis device described above further includes an operation procedure output unit configured to generate an illustration that visualized the structure of the operation procedure.

(8) Furthermore, in the event analysis device described above, the operation procedure editor is configured to output data representing the edited operation procedure to a manual operation automation device which is configured to standardize an operation operated manually by the DCS operator to automate the operation.

(9) Furthermore, in the event analysis device described above, the operation sequence extractor is configured to extract and narrow down the operation sequences including the operation of the high frequency operation to the extracted operation sequences, the operation procedure generator is configured to analyze respectively the operation sequences extracted by the operation sequence extractor and the operation sequences narrowed down by the operation sequence extractor.

(10) Furthermore, in the event analysis device described above, the operation procedure output unit is configured to generate an illustration representing the differences between the steady operation and the exception operation by displaying the differences between the operation procedures in a plurality of operation procedure whose operation frequency is different from each other.

(11) Furthermore, in the event analysis device described above further includes: the event log data manager configured to output event log data representing an operation history of an operation by a DCS operator.

(12) Some embodiments of the present invention provide an event analysis method. The event analysis method includes: collecting event log data representing an operation history by a DCS operator; analyzing the event log data, and extracting one or more basic unit operations or one or more unit operations representing an operation method based on operations of the DCS operator or an operation intention based on operations of the DCS operator; extracting one or more of operation sequences which the one or more basic unit operations or the one or more unit operations are aligned in accordance with time order in every service time period; clustering the operation sequences based on similarity among the operation sequences extracted in every service time period; analyzing the operation sequences clustered in same type, and estimating a structure of the operation procedure based on the operation of the DCS operator.

(13) Some embodiments of the present invention provide a non-transitory computer readable storage medium that stores a computer program for causing, when executed by a computer, the computer to perform. The non-transitory computer readable storage medium includes: collecting event log data representing an operation history by a DCS operator; analyzing the event log data, and extracting one or more basic unit operations or one or more unit operations representing an operation method based on operations of the DCS operator or an operation intention based on operations of the DCS operator; extracting one or more of operation sequences which the one or more basic unit operations or the one or more unit operations are aligned in accordance with time order in every service time period; clustering operation sequences based on similarity among the operation sequences extracted in every service time period; and analyzing the operation sequences clustered in same type, and estimating a structure of the operation procedure based on the operation of the DCS operator.

According to the present invention, it is possible to estimate the operation procedure of the DCS operator to support the standardization of the operation.

BRIEF DESCRIPTION OF THE DRAWINGS

FIG. 2 is a diagram showing an example of an event log table stored in an event log database of the events analysis system according to the first embodiment of the present invention.

FIG. 3 is a diagram showing an example of a basic unit operation table the analysis result database of the event analysis system stores according to an embodiment of the present invention.

FIG. 4 is a diagram showing an example of the unit operation table the analysis result database of the event analysis system stores according to an embodiment of the present invention.

DETAILED DESCRIPTION OF THE INVENTION

Figure 1:
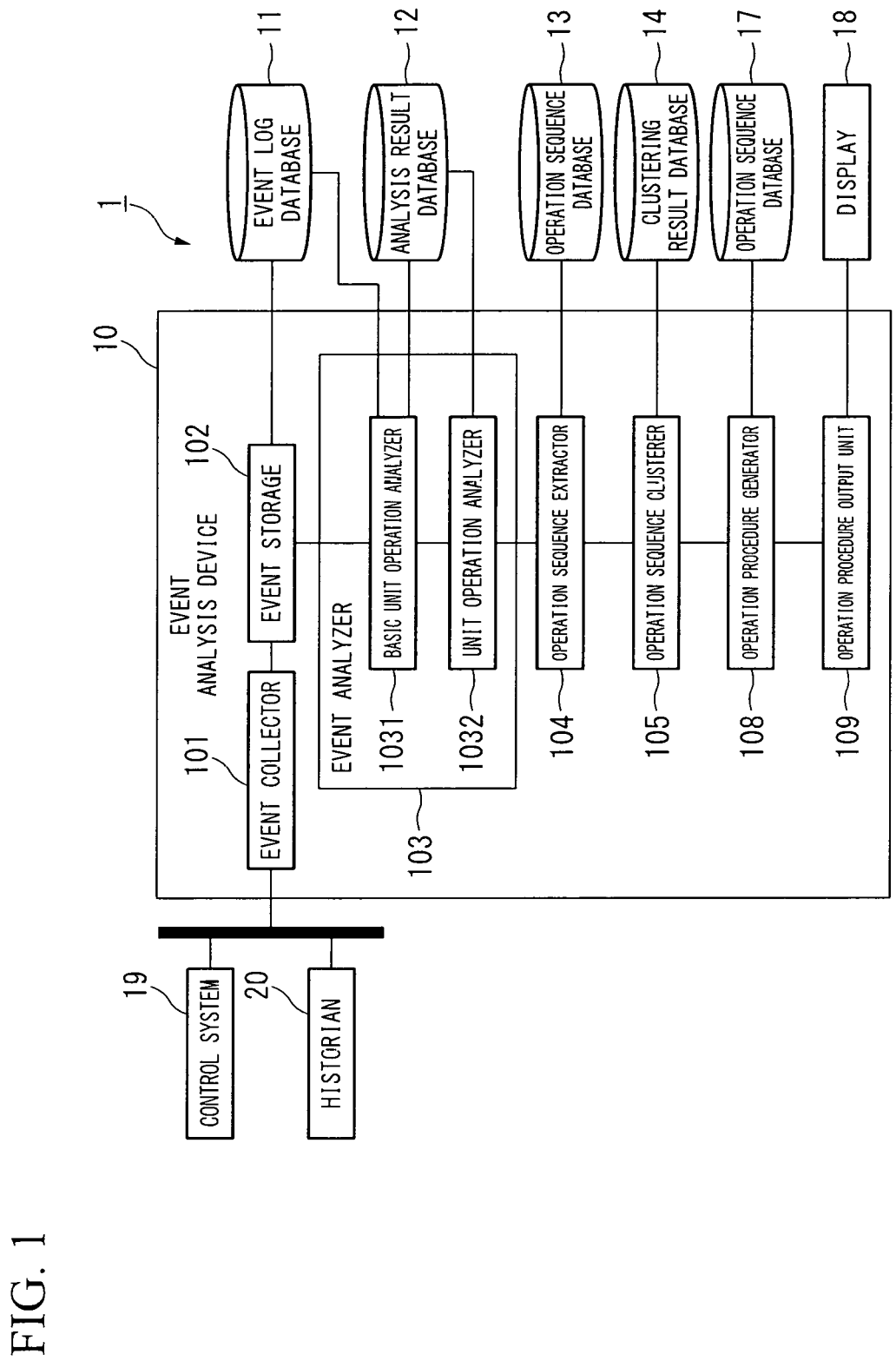
FIG. 1 is a block diagram showing a functional configuration of an event analysis system and an event analysis device according to the first embodiment of the present invention.

Hereinafter, a number of embodiments of the present invention will be described below, with references made to the drawings.

First Embodiment

An event analysis system according to the first embodiment of the present invention extracts operation intentions and operation methods of DCS operators from event logs representing operation histories of a control system operated by the DCS operators. In general, the DCS operator increases or decreases SV value (Set Variable) and MV value (Manipulated Variable) in order to increase or decrease process values such as flow amount and pressure. In addition, the DCS operator performs operation such as fine-tuning the process value in order to keep the value such as flow amount and pressure constant. That is, the operation intention of the DCS operator's operation is to make the process value as the target, for example, increasing, decreasing, or stable. In the present invention, the event analysis device extracts the operation intentions.

For example, in a case that the DCS operator may increase the process value, the event analysis device may change the setting by a ramping which is the operation gradually changing the SV value and MV value, or may change the setting of the SV value and the MV value at once operation. Thus, there are multiple types of the operation methods for the operation based on the same operation intentions. Furthermore, the operation of ramping may be decomposed into more detailed operation. Therefore, the embodiment of the present invention, a "basic unit operation" representing the operation method is defined by gathering the event logs of the plurality of operation. Further, the embodiment of the present invention, a "unit operation" representing the operation intention is defined by gathering a plurality of basic unit operation.

It may be defined any of the four types such as an "increase", a "decrease", a "fine-tuning" and a "increase and decrease" as the unit operation. The "increase and decrease" refers to the unit operation which is repeated the increasing and decreasing in short period. It may be also possible to define unit operation other than four types of the unit operation described above. In addition, as the basic unit operation, it may be defined any of the five types such as a "ramping (increase)", a "ramping (decrease)", a "fine-tuning", a "setting change (increase)", and a "setting change (decrease)". It may be defined another basic unit operation.

Incidentally, there exist the ramping operation for gradually increasing the SV value and the MV value or the like, and the ramping operation for gradually decreasing the SV value and the MV value or the like. Thereby, in the embodiment of the present invention, the ramping operation in order to increase such as the SV value and the MV value is to be referred to as a "ramping +", and the ramping operation in order to decrease such as the SV value and the MV value is to be referred to as a "ramping −". In addition, the setting change is greatly changing the value at once operation. Similarly in the case of the ramping, the setting change operation in order to increase the SV value and the MV value or the like is to be referred to as a "setting change +", and the setting change operation to in order to decrease the SV value and the MV value or the like is to be referred to as a "setting change −".

It is possible to define basic unit operation other than the five types basic unit operation described above, as well as the unit operation. The unit operation is higher abstract operation than the basic unit operation. Therefore, in the analysis process of the event log, firstly extracting the basic unit operation from the event log, and then the extraction processes of two-stages are performed, such as extracting the unit operation from the extracted basic unit operation.

Further, the event analysis system 1 according to the first embodiment, extracts a highly abstract operation sequences arranged extracted the basic unit operation or the unit operation in a time sequential in accordance with a time order to cluster the operation examples based on the difference (similarity) in operation sequences.

Further, the event analysis system 1 according to the first embodiment, extracts the high abstract operation group from the past event log regarding the specified operation to automatically generate the sequential order (including a sequential characteristics or parallel characteristics) of these operations and the operation procedure capable of reflecting the branch of the operation. Thus, the user can analyze the differences between the existing SOP using the operation procedure generated from past operation example, improve the SOP. Further, the event analysis system 1 according to the first embodiment, even if the SOP does not exist, it is possible to extract the outline of the SOP on the basis of the operation procedure.

(The Configuration of the Event Analysis System and the Event Analysis Device)

Next, the configuration of the event analysis system 1 and an event analysis device 10 according to the first embodiment will be described with reference to the drawings. FIG. 1 is a block diagram showing a functional configuration of the event analysis system 1 and the event analysis device 10 according to the first embodiment of the present invention. The event analysis system 1 according to the first embodiment includes the event analysis device 10, an event log database 11, an analysis result database 12, an operation sequence database 13, an clustering result database 14, an operation sequence database 17, a display 18, a control system 19, and a historian 20.

The event analysis device 10 includes, an event collector 101, an event storage 102, an event analyzer 103, an operation sequence extractor 104, an operation sequence clusterer 105, an operation sequence generator 108, an operation procedure output unit 109. Further, the event analysis device 10 includes a computer device, for example, a personal computer or a general-purpose computer. Further, the event analyzer 103 includes a basic unit operation analyzer 1031, a unit operation analyzer 1032.

The event collector 101 collects the event log data from at least one of the control system 19 and the historian 20. That is, the event collector 101 collects the event log data from the event log data manager manages the event log data. The event log data represents an event history such as the operation of the DCS operator operating the control system 19. The event collector 101 outputs the collected event log data to the event storage 102.

The control system 19 controls the plant (not shown). The control system 19 generates the event log data to output the event log data to at least one of the historian 20 or the event collector 101. The control system 19 may, for example, include a DCS. The historian 20 is a device for automatically collecting the huge event log data generated in the control system 19, and includes a database for the purpose of long-term storage. The historian 20 includes a storage medium, for example, a HDD.

The event storage 102 records the event log data inputted from the event collection unit 101 in an event log table stored in the event log database 11. The event log data includes the time of occurrence of the event, a device identifier (tag), an operation type identifier, a setting value before changing, and a setting value after changing.

The event log database 11 is a database for storing the event log table. The event storage unit 102 stores the event log data in the event log table. The event log database 11 includes storage mediums, for example, a HDD (Hard Disc Drive).

Examples of the event log table stored in the event log database 11, and the event log data recorded in the event log table will be described below with reference to FIG. 2. FIG. 2 is a diagram showing an example of the event log table stored in the event log database of the events analysis system according to the first embodiment of the present invention. As shown in FIG. 2, the event log table is, for example, a two-dimensional table format, which includes sequences of six data items such as an "event ID", a "date and time", a "tag name", an "operation type", a "previous value", and a "current value". In a case of the two-dimensional table format, each line included in the event log table is respectively one event log data.

In the item of the "event ID (Identifier)", a value representing an identifier for uniquely identifying each event log is stored. In the item of the "date and time", a value representing the time which each event occurred in the control system 19 (i.e., the date and time in which the event log was generated) is stored. In the item of the "tag name", in the case that a plurality of the control system 19 exists, a value representing the device identifier (tag) for uniquely identifying the control system 19 that generated the event logs is stored. In the item of the "operation type", a value representing the identifier representing the type of operation performed by the DCS operator is stored. In the item of the "previous value", a value representing the setting value (the previous value) before the DCS operator changing the setting value is stored. In the item of the "current value", a value representing the setting value (the current value) after the DCS operator changing the setting value is stored. Incidentally, the format of the event log table described above is not limited to the above-noted example.

For example, the first the event log data shown in FIG. 2 represents that the DCS operator changes an operating mode of the "TAG1" device from "AUT" to "MAN" at "Aug. 21, 2015 at 10:00:00". It should be noted that, the "AUT" means an automatic operation, and the "MAN" means a manual operation. Subsequently, the second the event log data shown in FIG. 2 represents that the DCS operator changes the setting value of the "MV (an operation amount)" of the "TAG1" device from "25.0(%)" to "30.0(%)" at "Aug. 21, 2015 at 10:00:10".

Returning to FIG. 1 again, the configuration of the event processor according to the first embodiment will be described below. The event analyzer 103 acquires the event log data corresponding to the multiple service time periods specified by the user from the event log table. The event analyzer 103 divides the event log data into two stages to extracts the operation easy for the user. First, in the first stage, the event analyzer 103 gathers the event log to extract a "basic unit operation" indicating the operation method. Then, in a second stage, the event analyzer 103 gathers the basic unit operations to extract a "unit operation" representing the operation intention by the DCS operator. These extraction processing are carried out a basic unit operation analyzer 1031 and a unit operation analyzer 1032 respectively provided in the event analyzer 103.

The basic unit operation analyzer 1031 reads one or more of the event log data among the specified service time period stored in the event log database 11, and analyzes the characteristics of changing of the continuity in time and the changing of the setting values of the event log data. Then, the basic unit operation analyzer 1031 determines the operation method of the DCS operator (such as the ramping and the fine-tuning). And then, the basic unit operation analyzer 1031 clusters the event log data based on the determination result as an event log data group, and to extract each of the event log data group as the basic unit operation. The basic unit operation represents the operation method of the operator described above. The basic unit operation analyzer 1031 extracts an event log group which is the event log group using the identical device and the same type operation types, extracts the basic unit operation based on the changing trend of the setting value and the continuity of the time in the event log group. The event log group is the group of the event log data which the value of the items in the "tag name" is identical, and the value of the item of "operation type" is identical in the event log table stored in the event log database 11. The basic unit operation analyzer 1031 records the extracted data representing the basic unit operation (hereinafter, referred to as the basic unit operation data) in the basic unit operation table stored in the analysis result database 12.

The analysis result database 12 is a database that stores the basic unit operation table and the unit operation table. The basic unit operation table and the unit operation table records the analysis result data indicating the analysis result of the event log by the event analysis device 10. The analysis result database 12 includes storages, for example, the HDD.

The basic unit operation analyzer 1031, for example, acquires the information representing that the event memory 102 recorded the event log data in the event log table stored in the event log database 11 from the event memory 102. The basic unit operation analyzer 1031 implements the extraction process and the recording process of the basic unit operation as described above in the timing which the basic unit operation analyzer 1031 acquired the information.

An example of the basic unit operation table stored in the analysis result database 12 and the basic unit operation data recorded in the basic unit operation table will be described with reference to FIG. 3. FIG. 3 is a diagram showing an example of a basic unit operation table the analysis result database 12 of the event analysis system 1 stores according to the first embodiment of the present invention. As shown in FIG. 3, the basic unit operation table is, for example, a two-dimensional table format which includes the sequences of seven data items such as a "basic unit operation ID", a "starting date and time", an "ending date and time", a "tag name", an "operation type", an "operation method", and an "event ID". In a case of the two-dimensional table format, each line included in the basic unit operation table is respectively one basic unit operation data.

In the item of the basic unit operation ID, a value representing the identifier for uniquely identifying each basic unit operation is stored. In the item of the starting date and time, a value representing the starting date and time of each basic unit operation is stored. The starting date and time means the date and time which the firstly generated event log among the event log included in the basic unit operation is generated. In the item of the ending date and time, the value representing the ending date and time of each the basic unit operation is stored. The ending date and time means the date and time which the lastly generated event log among the event log included in the basic unit operation is generated.

In the item of the tag name, in the case that a plurality of the control system 19 exists, a value representing the device identifier (the tag) for uniquely identifying the control system 19 that generated the event log is stored. In the item of the operation type, a value representing an identifier representing the operation type that the DCS operator performed is stored. In the item of the operation method, a value representing the operation method which the DCS operator performed is stored. In the item of the event ID, a value representing the event ID of each event log included in the basic unit operation is stored. Incidentally, the format of the basic unit operation table described above is not limited to the form described above.

For example, the first basic unit operation data (i.e., the basic unit operation data of which the basic unit operation ID is No. 1) shown in FIG. 3 represents that the DCS operator changes the operation mode of the "TAG1" device from "AUT" to "MAN" at "Aug. 21, 2015 at 10:00:00". Subsequently, the second basic unit operation data (i.e., the basic unit operation data of which the base unit operation ID is a "No. 2") shown in FIG. 3, represents that the DCS operator performed ramping the setting value of the "MV (the operation amount)" of the "TAG1" device, from "Aug. 21, 2015 at 10:00:10" to "Aug. 21, 2015 at 10:01:00". Since the value of the "operation method" is the "ramping +", the basic unit operation represents that the DCS operator performed ramping operation to increase the setting value.

Returning to FIG. 1 again, the configuration of the event processing apparatus according to the first embodiment will be described. The unit operation analyzer 1032 reads one or more of the basic unit operation data among the specified service time period stored in the analysis result database 12, by using information of a basic unit operation analyzed by the basic unit operation analysis unit 1031, based on the rules on the basis of the domain knowledge (e.g., knowledge in the control of the plant) and, estimates the operation intention what change the DCS operator give to the process to extract the unit operation. In other words, the unit operation analyzer 1032 clusters the basic unit operation data as a basic unit operation data group based on the information described above, and to extract each of the basic unit operation data group as the unit operation. The unit operation, as described above, represents the operation intention of the DCS operator. The unit operation analyzer 1032 records the data representing the extracted unit operation (hereinafter, referred to as a unit operation data) to the unit operation table stored in the analysis result database 12.

The unit operation analyzer 1032 acquires, for example, information representing that the basic unit operation analyzer 1031 recorded the basic unit operation data to the base unit operation table from the basic unit operation analyzer 1031. The unit operation analyzer 1032 implements the extraction and the recording of the unit operation described above at the timing of acquiring information.

An example of the unit operation table stored in the analysis result database 12 and the unit operation data recorded in the unit operation table will be described with reference to FIG. 4. FIG. 4 is a diagram showing an example of the unit operation table the analysis result database 12 of the event analysis system 1 stores according to an embodiment of the present invention. As shown in the FIG. 4, the unit operation table is, for example, a two-dimensional table format which include sequences of six data items such as an "unit operation ID", a "starting date and time", an "ending date and time", a "tag name", an "operation intention", and a "basic unit operation ID". In a case of the two-dimensional table format, each line included in the unit operation table is respectively one unit operation data.

In the item of the "unit operation ID", a value representing the identifier for uniquely identifying each unit operation is stored. In the item of "starting date and time", a value representing the starting date and time of each unit operation is stored. The starting date and time is the date and time of the firstly performed basic unit operation among the basic unit operation included in the unit operation. In the item of the "ending date and time", a value representing the ending date and time of each unit operation is stored. The ending date and time is the date and time of the lastly performed basic unit operation among the basic unit operation included in the unit operation.

In the item of the "tag name", in the case that a plurality of the control system 19 exists, a value representing the device identifier (the tag) for uniquely identifying the control system 19 that generated the event log is stored. In the item of the "operation intention", a value representing the operation intention which the DCS operator performed is stored. In the item of the "basic unit operation ID", a value representing the basic unit operation ID in each basic unit operation included in the unit operation is stored. Incidentally, the format of the unit operation table described above is not limited to the form described above.

For example, the first unit operation data (i.e., the unit operation data of which the unit operation ID is "No. 1") shown in FIG. 4, represents that the DCS operator performed operation intended "increasing the flow amount" of the "TAG1" device, "Aug. 21, 2015 at 10:00:10" to "Aug. 21, 2015 at 10:03:01". Subsequently, the second unit operation data (i.e., the unit operation data of which the unit operation ID is "No. 2") shown in FIG. 4, represents that the DCS operator performed operation intended "fine-tuning of the temperature" of the "TAG1" device, "Aug. 21, 2015 at 10:00:50" to "Aug. 21, 2015 at 10:02:50".

Returning to FIG. 1 again, the configuration of the event processor according to the first embodiment will be described below. An operation sequence extractor 104 generates the data combined (arranged in the time sequential) the data representing the basic unit operation and the data representing the unit operation extracted by the event analyzer 103 in time order in accordance with the time order). In the embodiment, the set combined the data representing the basic unit operation and the data representing the unit operation in time order is to be referred to as "operation sequences". In other words, the set arranged the data representing the basic unit operation and the data representing the unit operation in time sequential is to be referred to as the "operation sequences".

The operation sequences consisting of the basic unit operation includes information indicating an "operation method" representing which value of the parameters in which way the DCS operator changed for each device. Further, the operation sequences including the unit operation includes information representing the "operation intention" representing which intention the DCS operator operated for each device.

The operation sequence extractor 104 extracts the operation sequences at the time of the service from the event log based on the specified service period. In order to extract the operation sequences at the time of service, the operation sequence extractor 104 extracts the operation sequences which is the set arranged the unit operation or the basic unit operation in time sequential in accordance with time order to each service period. The operation sequence extractor 104 stores the operation sequences in the operation sequence database 13. The operation sequences mean the operation sequences corresponding to each of the service time periods. The operation sequence database 13 is a database that stores the operation sequence data. The operation sequence database 13 includes storage mediums, for example, a HDD.

The operation sequence clusterer 105, if the multiple service periods were specified, compares one or more of the basic unit operations or one or more of the unit operations comprising each of the operation sequences in each time sequential, and determines a degree of the similarity between each of the operation sequences to the one or more of operation sequences included in a plurality of operation sequences which the operation sequence extractor 104 extracted. The operation sequence clusterer 105 further clusters the operation sequences based on the determined similarity. The operation sequence clusterer 105 stores the above-noted cluster analysis according to the cluster analysis in the clustering result database 14. The clustering result database 14 is a database for storing the cluster analysis result of the operation sequences. The clustering result database 14 includes a storage medium, for example, a HDD.

The operation procedure generator 108 analyzes the operation sequences clustered into the same or similar type to estimate the structure of the operation procedure. These operation sequences include the basic unit operation or the unit operation. The operation procedure generator 108, in order to estimate the structure of the operation procedure, extracts the operation procedure from the individual unit operation configured in time sequential in accordance with time order from the operation sequences. Further the operation procedure generator 108 estimates the sequential characteristics between sets of the unit operation contiguous in time order with each other, the parallel characteristics between one set of the unit operation and another set of the unit operation in particular time order, and the connection information representing the order or branch of the unit operation. The connection information referred to here, includes not only the information of the connection source and the connection destination representing the context of the unit operation, but also the information representing the probability of transition from the connection source to the each of the connection destinations when the branch of the unit operation exists.

Furthermore, the operation procedure generator 108 performs the integration processing for determining a distribution of the parameter settings regarding each of the unit operations, a distribution of the execution duration, and a distribution of time intervals between the unit operations. In addition, the operation procedure generator 108 generates structural information regarding each of the operation procedures to record in the operation procedure database 17. The operation procedure database 17 stores the structural information regarding the operation procedure. The operation procedure database 17 includes a storage medium, for example, a HDD.

The operation procedure output unit 109 performs processing for visualizing the operation procedure with the acyclic directed graph based on the structure information of the operation procedure generated by the operation procedure generator 108. In the acyclic directed graph of the operation procedure, each node represents a unit operation that generates the operation procedure. Arrow between nodes represents an order relation of sequential between the unit operations, two horizontal lines that are parallel represent a parallel relationship between the unit operation. Furthermore, probability of the transition from a connection source node to the connection destination node is denoted next to each arrow. The operation procedure output unit 109 causes the display 18 the visualized graph. The display 18 may include, for example, a liquid crystal display or an organic EL (Electro Luminescence) display.

(The Output Screen Example of the Structure Information of the Operation Procedure)

Figure 5:
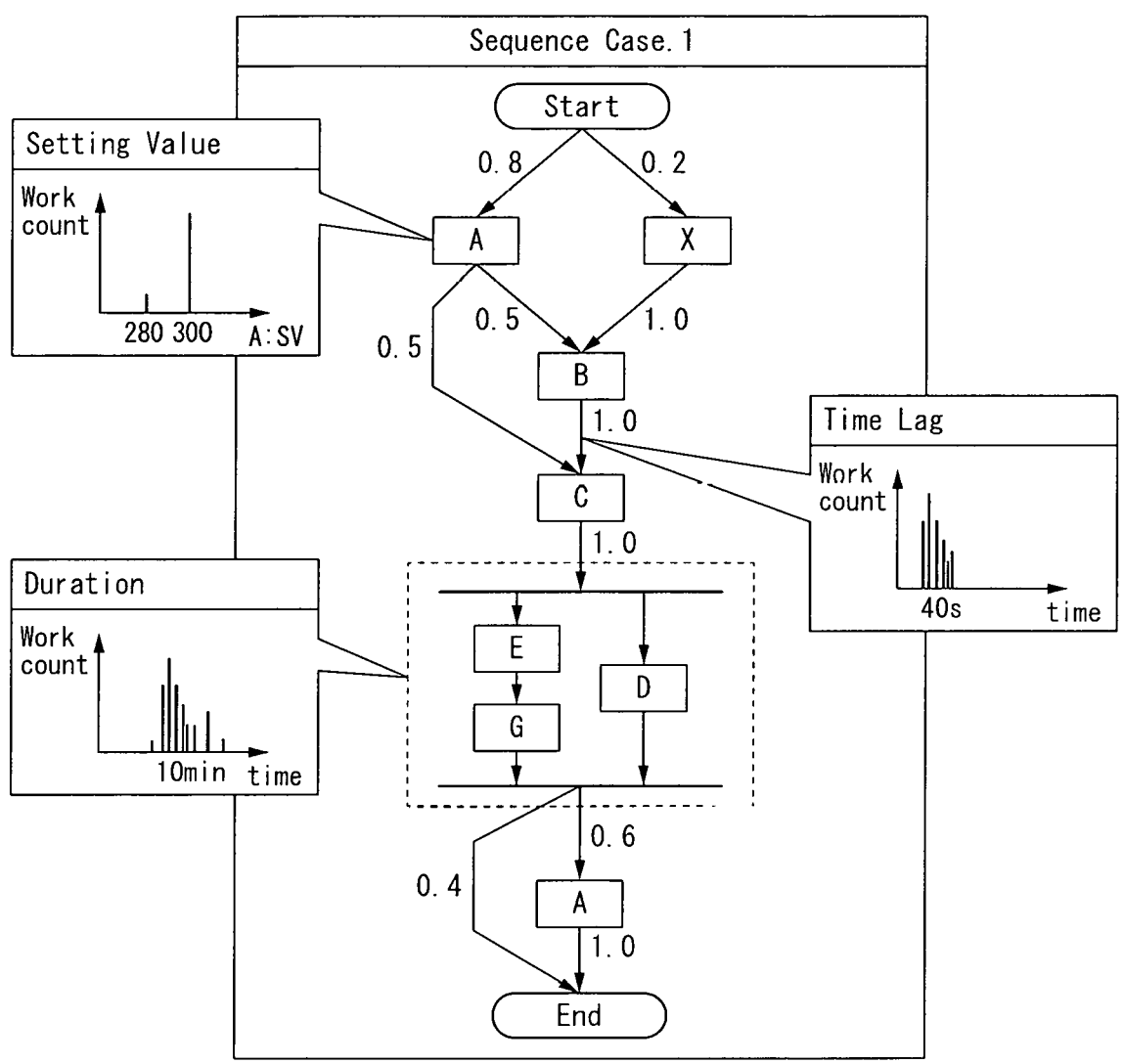
FIG. 5 is a diagram showing an example of the output screen generated by the operation procedure output unit of the event analysis device according to the first embodiment of the present invention.

Hereinafter, an example of displaying the structural information of the operation procedure will be described with reference to the drawings. FIG. 5 is a diagram showing an example of the output screen generated by the operation procedure output unit 109 of the event analysis device 10 according to the first embodiment of the present invention. For example, in FIG. 5, an arrow between a node A and a node B represents the sequence relationship of sequential which the unit operation A precedes the unit operation B. 0.5 which is denoted next to the arrow from the node A to the node B represents a probability that the unit operation B is performed next to the unit operation A.

Also, for example, in FIG. 5, there exists the arrow not only from node A to a Node B, but also from node A to node C. This means that the two branches of the nodes exist from the node A to the Node B, and from the node A to the node C. Also, for example, in FIG. 5, a node D, a node E, and a node G is held between two parallel lines. In other words, this means that the node D is parallel with the node E, and the node D is parallel with the node G.

The user operates the event analysis apparatus 10, and then selects each node of the graph. The operation procedure output unit 109 displays the statistics information regarding such the setting value of each unit and the executing duration (for example, a "Setting Value" screen and a "Duration" screen in FIG. 5). In addition, when the user operates the event analyzer 10 to select the connection line, and to display the statistical information regarding the time interval between the unit operation of the connection source and the unit operation of the connection destination to the operation procedure output unit 109 (for example, "Time Lag" screen in FIG. 5).

Incidentally, when the user operates the event analysis apparatus 10, and selects the nodes and the connecting lines, for example, the user may click the nodes and connecting lines which are displayed on the display 18 by the operation procedure output unit 109. Further, a "Setting Value" screen, a "Duration" screen, and a "Time Lag" screen shown in FIG. 5 are, for example, displayed with pop up screen superimposed on an graph image on the display 18. The operation procedure output unit 109 can recommend suitable analyzed operation procedure by blinking the node or highlighting using color marks, the user can select nodes and connecting lines on the basis of the recommendation.

The operation procedure output unit 109 includes an input unit that receives an input operation of the event analysis device 10 by the user, and includes, for example, a keyboard, a mouse or a touch panel or the like. The input unit may be included in the display 18.

(The Behavior of the Event Analysis Device)

Figure 6:
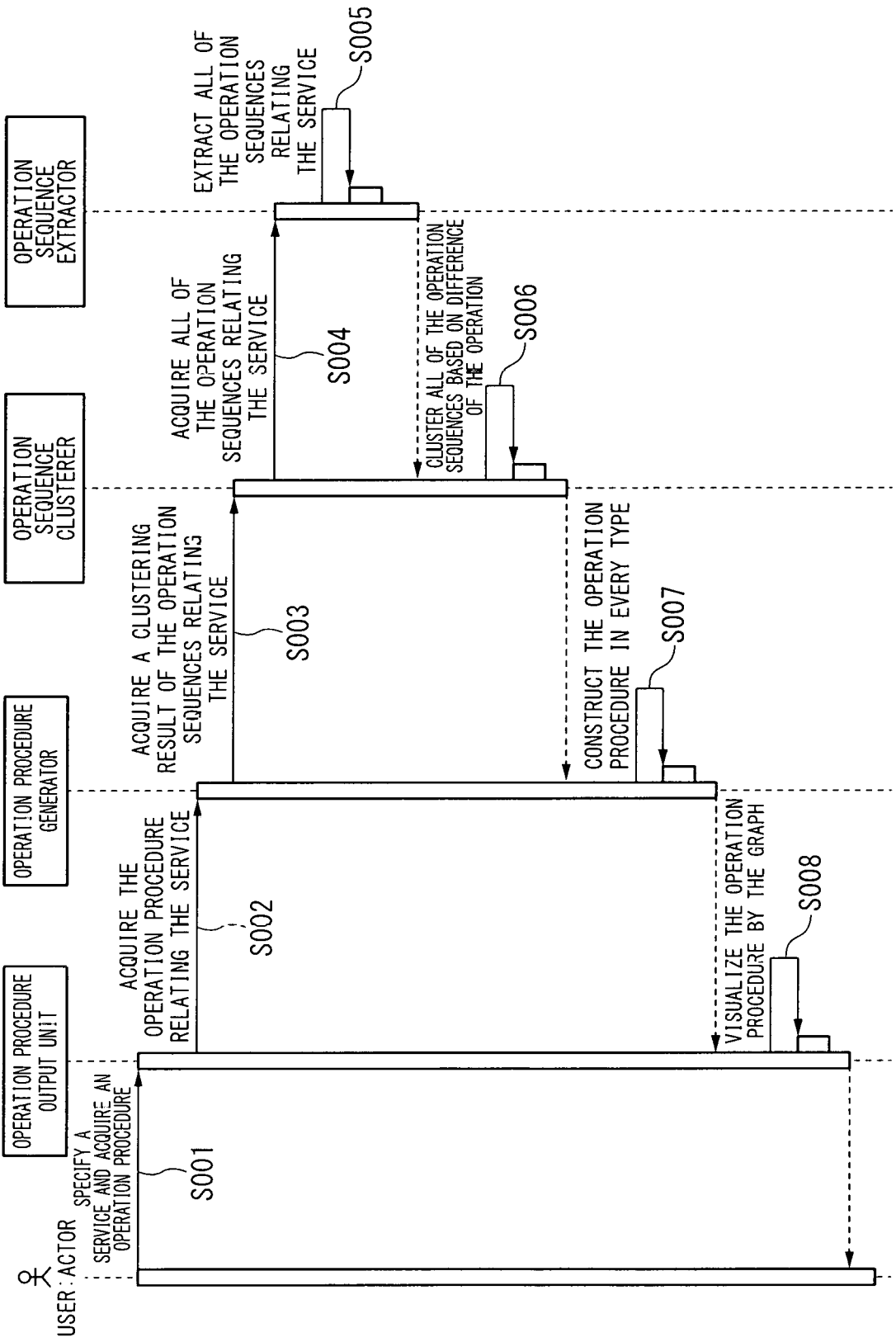
FIG. 6 is a sequence diagram showing an operation of the event analysis device according to the first embodiment of the present invention.

Next, the operation of the event analysis device 10 will be described with reference to the drawings. FIG. 6 is a sequence diagram showing an operation of the event analysis device 10 according to the first embodiment of the present invention. In FIG. 6, an example of the behavior in the case that the user specifies a plurality of implementation periods of the targeted service, and the event analysis device 10 displays the actual operation procedure, will be described.

(Step S001) The operation procedure output unit 109 acquires information indicating a plurality of service time periods specified by the user. That is, the user specifies the plurality of service time periods to request the display of the operation procedure.

(Step S002) The operation procedure output unit 109 outputs data representing a plurality of the specified service period to the operation procedure generator 108 corresponding to the user's request to request the operation procedure related to the specified service.

(Step S003) The operation procedure generator 108 outputs data representing specified multiple service periods to the operation sequence clusterer 105 to request the operation sequence information for each type.

(Step S004) The operation sequence clusterer 105 outputs the data representing the specified multiple service periods to the operation sequence extractor 104, and to request the operation sequence information in each service period.

(Step S005) The operation sequence extractor 104 accesses the event log database through the event analyzer 103 to cut out the operation sequences in each specified service period. In addition, the operation sequence extractor 104 extracts the operation sequences arranged the unit operation in each time order, in time sequential in accordance with time order from each operation sequences as the operation sequences. The operation sequence extractor 104 outputs the data representing the extracted operation sequences to the operation sequence clusterer 105.

(Step S006) The operation sequence clusterer 105 determines the degree of the similarity between the operation sequences included in each operation sequence for all operation sequences that have been extracted by the operation sequence extractor 104. The operation sequence clusterer 105 clusters the operation sequences based on the determined degree of the similarity. The operation sequence clusterer 105 outputs a cluster analysis result to the operation procedure generator 108.

(Step S007) The operation procedure generator 108 analyzes the operation sequence groups clustered into each type to create the operation procedure. The operation procedure generator 108 outputs the structure information of each type of operation procedure to the operation procedure output unit 109.

(Step S008) The operation procedure output unit 109 generates a graph based on the structure information of each type of operation procedure, is displayed on the display 18.

Thus, the user of the event analysis device 10 can refer to the operation procedure regarding the specified service using the display 18, can compare the displayed operation procedures on the display 18 and the description of the existing SOP, and can obtain information for describing the new SOP. Incidentally, it may use the "basic unit operation" representing the specific operation method is utilized as a component of the operation sequences, instead of being utilized the "unit operation" represented in the above example, the user of the event analyzer 10 can refer to the information regarding the detailed operation content such as the operation method of the DCS operator.

(The Structure Processing of the Operation Procedure)

Figure 7:
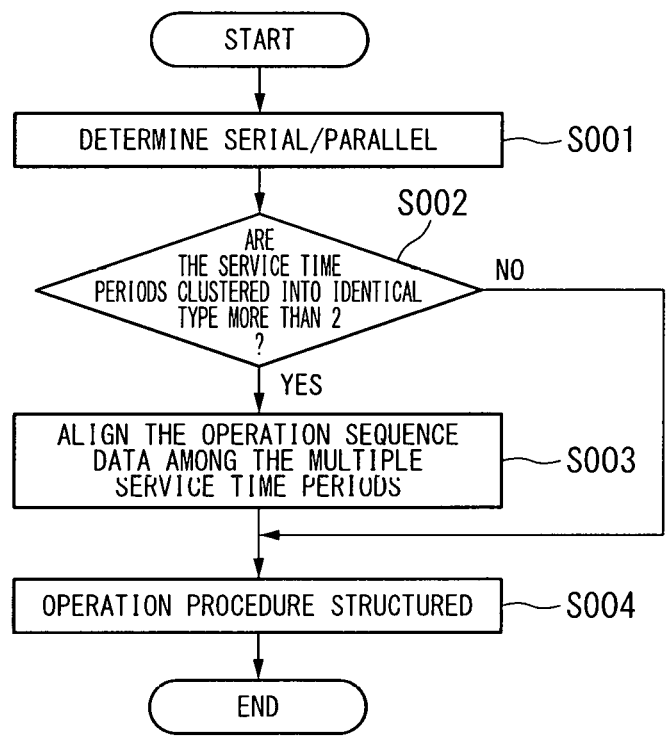
FIG. 7 is a flowchart showing one example of flow of a structure operation of the operation procedure of which the operation procedure generator of the event analysis device according to the first embodiment of the present invention.

Details of the process for generating an operation procedure in the operation procedure generator 108 will be described with reference to the drawings. FIG. 7 is a flowchart showing one example of flow of the structure operation of the operation procedure of which the operation procedure generator 108 of the event analysis device 10 according to the first embodiment of the present invention. This flowchart starts when the operation procedure generator 108 is requested the operation procedure regarding the service from the operation procedure output unit 109 (for example, Step S002 in FIG. 6).

(Step S101) The operation procedure generator 108 analyzes the same or similar types of the operation sequence data, and determines the sequential characteristics or parallel characteristics of the unit operation. The operation procedure generator 108 sets the determination rule based on the domain knowledge of the plant operation to determine the sequential characteristics or parallel characteristics, and determines whether the unit operation is parallel or sequential based on the set criteria. For example, if either of the conditions of the following 1) or 2) meets in a case that the start time difference Δt of the two unit operations is within the threshold, the operation procedure generator 108 judges the two unit operations are the operation in relation to be parallel (parallel operation).

1) The order is indefinite. For example, there is case of the unit operation A→the unit operations B, or there is also case of the unit operation B→the unit operations A.

2) The periods of the two unit operations are substantially overlapped. For example, in the two unit operations, "the start time of the latter unit operation<the start time of the prior unit operation+0.5×implementation period".

Incidentally, if any of the above conditions are satisfied, the operation procedure generator 108 judges the two unit operations are in relationship of the sequential (sequential operation).

Figure 8:
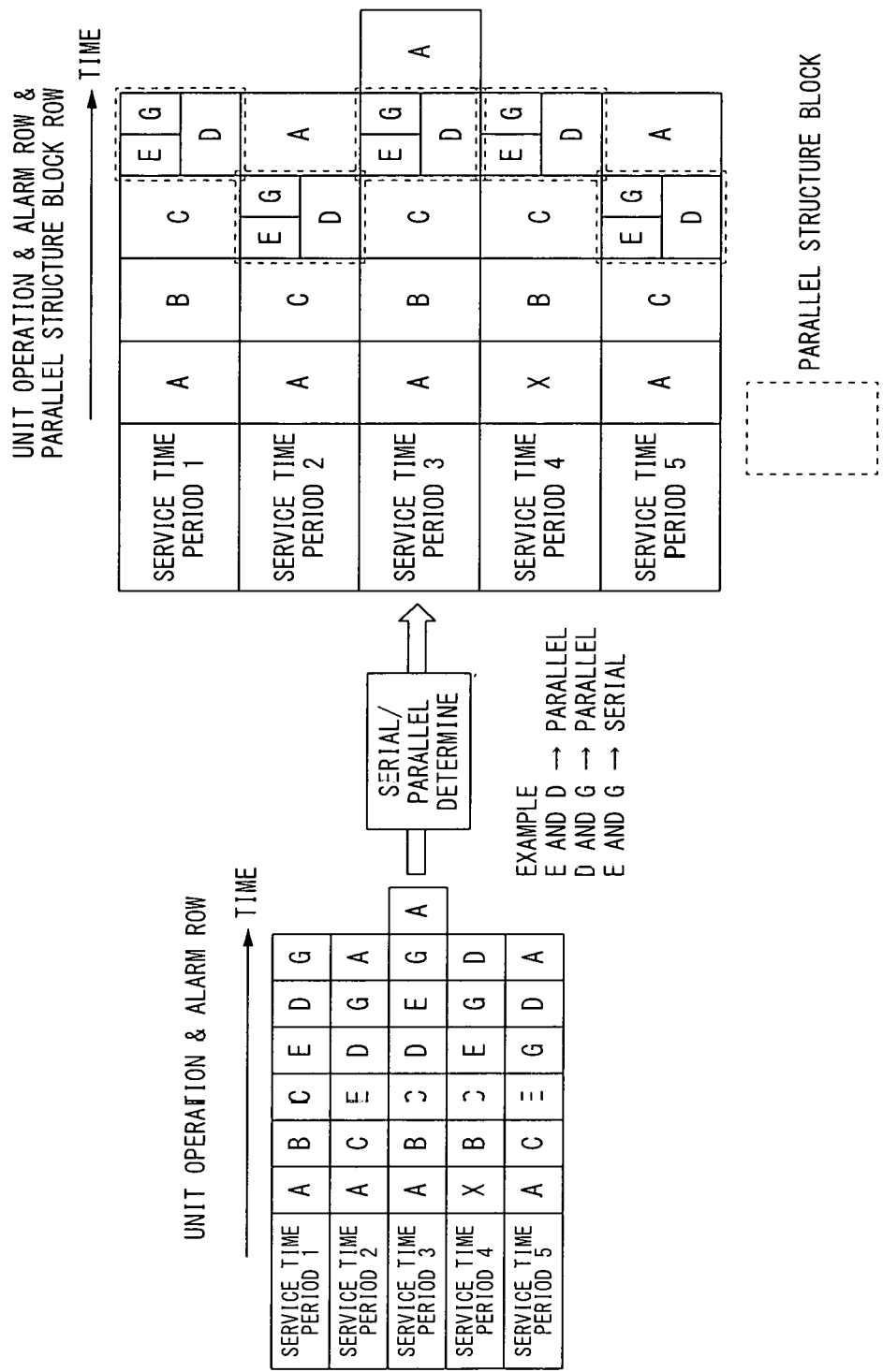
FIG. 8 is a diagram showing an example of a sequential/parallel determination processing by the operation procedure generator of the event analysis device according to the first embodiment of the present invention.

Moreover, the operation procedure generator 108 estimates the internal structure of the parallel based on the sequential characteristics or parallel characteristics between the respective unit operations regarding the parallel relationship in three or more unit operations. FIG. 8 is a diagram showing an example of a sequential/parallel determination processing by the operation procedure generator 108 of the event analysis device 10 according to the first embodiment of the present invention. For example, the operation procedure generator 108 determines that the unit operation E and the unit operation D shown in FIG. 8, and the unit operation G and the unit operation D are in parallel each other, when it is determined that the unit operation E and the unit operation G are in sequential, FIG. 8 shows the structure of the sequential/parallel composite type which is surrounded by a dotted line on the right side of FIG. 8.

After the parallel determination process has been done noted-above, the operation procedure generator 108 gathers the operation groups in parallel relationship to the parallel structure block and then updates the operation sequence data. For example, as shown in FIG. 8, when the above-mentioned sequential/parallel determination process is performed to the operation sequence data within the five service period, and the parallel relationship between the unit operation D and the unit operation E, and the unit operation D and the unit operation G is detected, the operation procedure generator 108 are gathers the unit operation D and the unit operation E, and the unit operation D and the unit operation G in the parallel structure block represented in FIG. 8. Then, the operation procedure generator 108 sorts the operation sequence data in generation time order (in time order) along with the unit operation of other sequential relationship to constitute the new operation sequence data. Here, the updated operation sequence data includes the parallel structure block as well as the unit operation. Then, the process proceeds to step S102.

(Step S102) If the service periods clustered into the same or similar type exist two or more, the process proceeds to the step S103. If service period which are clustered into the same or similar kind is one, the process proceeds to step S104.

Figure 9:
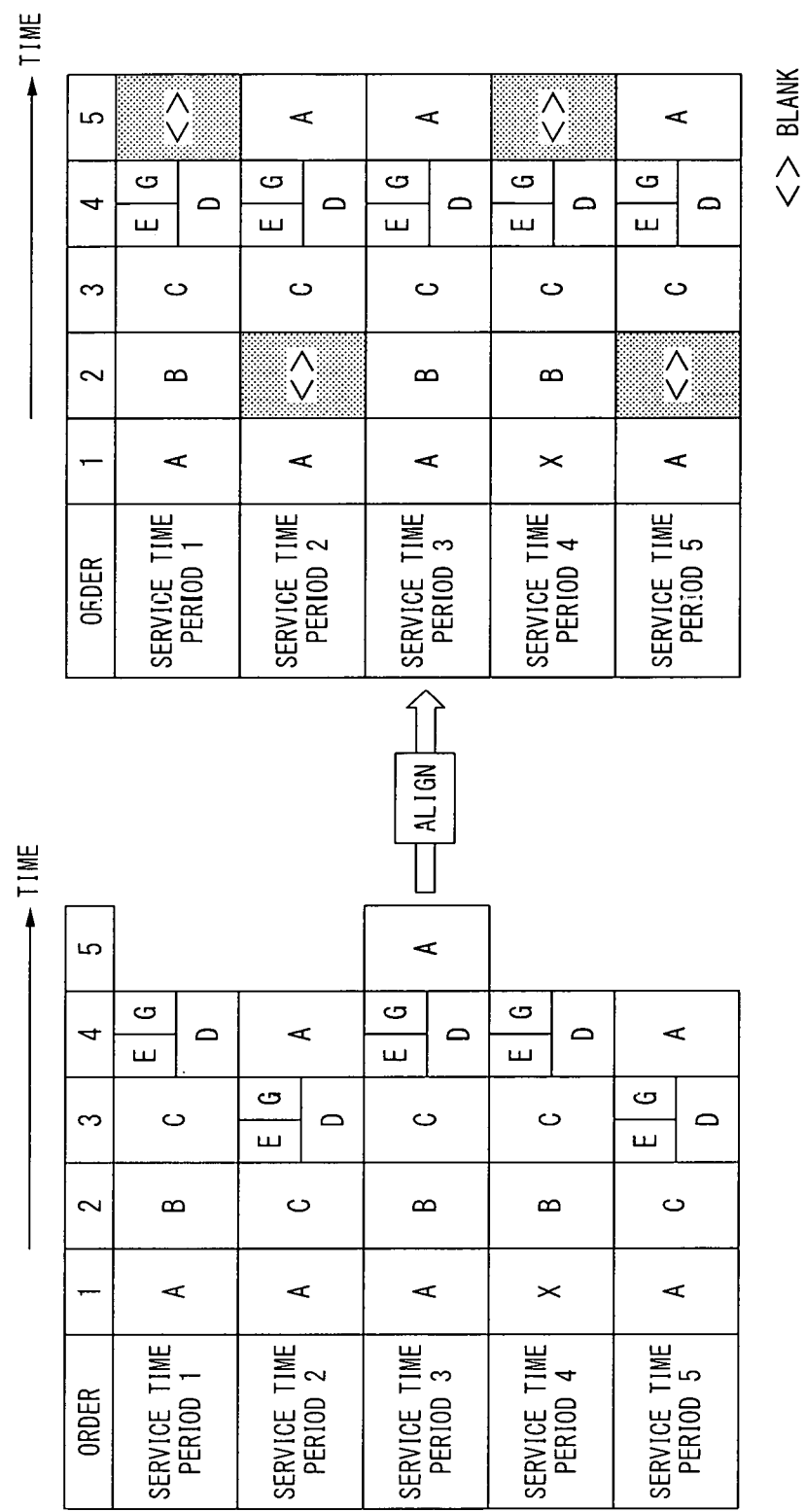
FIG. 9 is a diagram showing an example of the alignment process of the event data by the operation procedure generator of the event analysis device according to the first embodiment of the present invention.

(Step S103) Next, the operation procedure generator 108 orders in the generation time order (in time sequential) with respect to the elements (unit operation/parallel structure block) included in the operation sequence data of each service period. FIG. 9 is a diagram showing an example of the alignment process of the operation sequence data by the operation procedure generator 108 of the event analysis device 10 according to the first embodiment of the present invention.

For example, the operation procedure generator 108 orders the time order such as "1", "2", "3", and "4" from left to right with respect to the four unit operations included in the service period 1 shown on the left side of FIG. 9. In addition, the operation procedure generator 108 inserts one or more of blank unit operations between the unit operations in every service period, and then aligns the same or similar type of the unit operation/parallel structure block so as to align the same order as much as possible. FIG. 9 shows the operation sequence data on the right side thereof which are aligned the unit operations of five service periods by the operation procedure generator 108 shown on the left side of FIG. 9.

For example, the operation procedure generator 108 inserts one or more of blank unit operations respectively in front of the unit operation C in the service period 2 and the service period 5 with respect to the same kind of the unit operation C included in the five service periods shown in FIG. 9, and then can be aligned the unit operation C in all service periods to the time order 3. In addition, the operation procedure generator 108 may insert one or more of dummy unit operations back and forth of the time order of the unit operation in particular service time period. Further, the operating procedure generator 108 can move up the time order of a desired unit operation in a specific service time period, or move down thereof. Further, the operating procedure generator 108 may delay the desired unit operation in a specific business period time.

It can be used the algorithm of alignment as the above-noted alignment process. As an example, the alignment of the nucleotide sequences of DNA (deoxyribonucleic acid), and the alignment of the amino acid sequences of the protein. When the performing the alignment for the two operation sequence data, it is possible to use an algorithm of the pairwise alignments in the dynamic programming. Further, when performing alignment for three or more operation sequence data, it can use the algorithm of multiple alignments such as the tree-based method or the center star method (reference: "Mathematical and algorithm of the Bioinformatics (Algorithm Science Series—case study edition)" P.17-P.53). Further, since the tree-based method and the center star method can only be obtained approximate solution, if there is inadequate point regarding the alignment result by the Tree-Based Methods and the Center Star method, it may be added to the correction. Then, the process proceeds to step S104.

(Step S104) The operation procedure generator 108 creates the operation procedure based on the aligned operation sequence data. The operation of creating the operation procedure is as shown from the following 1) to 4).

Figure 10:
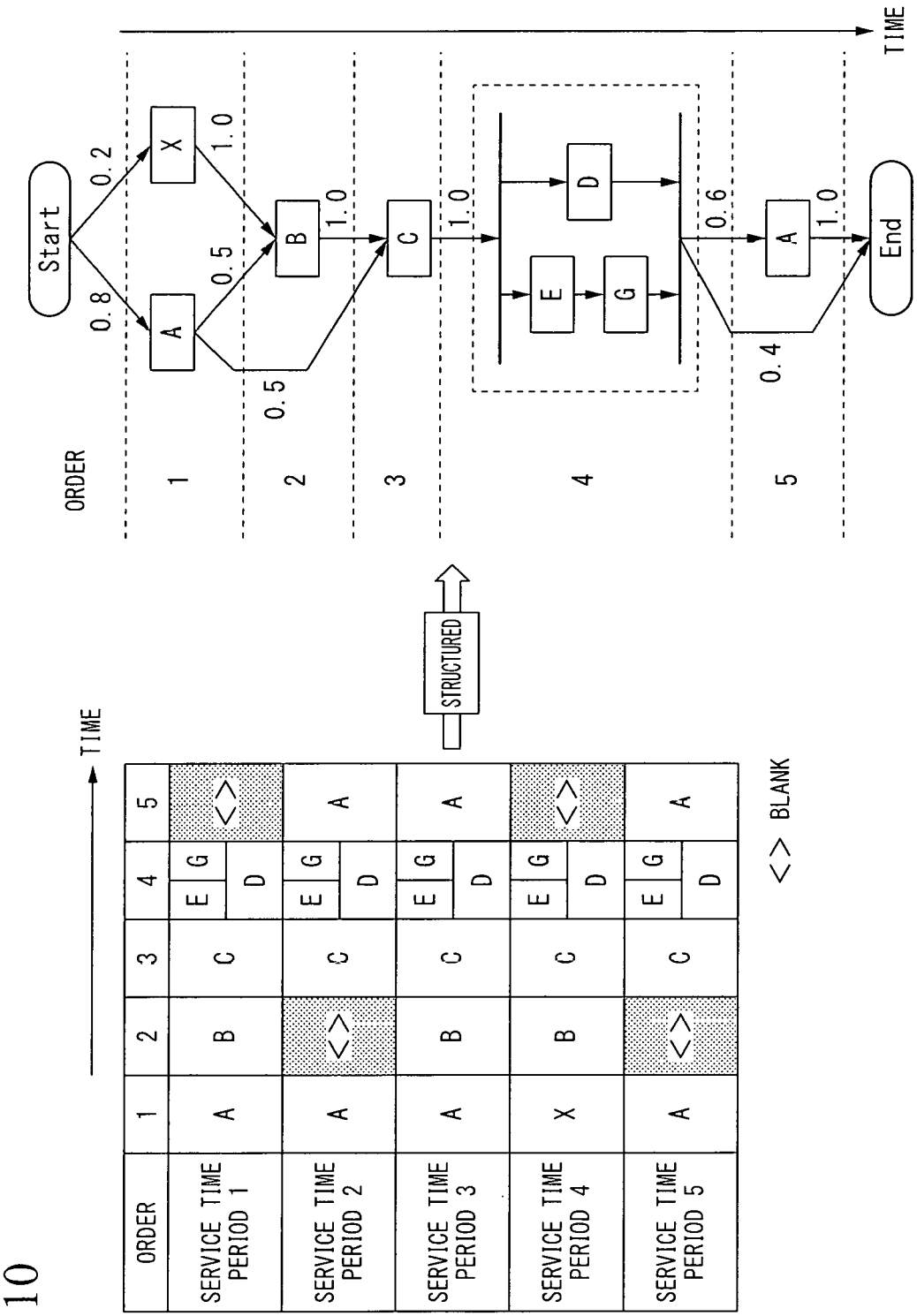
FIG. 10 is a diagram showing an example of a structure of the operation procedure by the operation procedure generator of the event analysis device according to the first embodiment of the present invention.

1). The operation procedure generator 108 extracts the same or similar type unit operation/parallel structure blocks in the same order as a one component of the operation procedure based on the operation sequence data. FIG. 10 is a diagram showing an example of the structure of the operation procedure by the operation procedure generator 108 of the event analysis device 10 according to the first embodiment of the present invention. For example, in the operation sequence data of the five service periods shown on the left side of FIG. 10, there are the same types of the components "unit operation A" in the time order 1 of the service periods 1, 2, 3, and 5. Further, there is a "unit operation X" in the time order 1 of the service period 4. Therefore, in the time order 1 of the operation procedure shown in the right side of FIG. 10, two components "unit operation A" and "unit operation X" are extracted. However, even if the type is same or similar, when the time order is different, these operation sequence data is extracted as a separate component. For example, as the operation procedure shown in FIG. 10, two components such as the "unit operation A" in time order 1 and the "unit operation A" in time order 5 is extracted.

2) The operation procedure generator 108 sorts all of the extracted components in the order of the "time order", aligns the element generating the operation procedure. It is also possible to include a plurality of unit elements in the same time order.

3) The operation procedure generator 108 determines the connection relationship between all of the components (unit operations) to each other that were in adjacent relationship in time order on the basis of the operation sequence data. The operation procedure generator 108 defines the components in the low time order as a source connection, and defines the components in the high time order as a connection destination. However, the adjacent relationship described here represents the relationship between the previous element and the next element (except for blank) in time order, in the operation sequence data for each operation period. For example, the "unit operation A" in the time order 1 shown in FIG. 10 is in adjacent relationship with the "unit operation B" in the time order 2 in the service periods 1, 3, and 4. Therefore, the connection relationship is determined that the "unit operation A" in the time order 1 is determined the connection source and the "unit operation B" in the time order 2 is determined the connection destination. Further, the "unit operation A" in the time order 1 is in adjacent relationship with a "unit operation C" in a time order 3 by removing the blank in the time order 2 in the service periods 2, and 5. Therefore, the connection relationship is determined that the "unit operation A" in the time order 1 determined as the connection source and the "unit operation C" in the time order 3 determined as the connection destination. Here, a case where there is a plurality of connection destinations to the one connection source is referred to as the "branch".

4) The operation procedure generator 108 determines the probability (transition probability) of transition to each destination in the case where there is a branch from the connection source. Transition probability is ratio of number of times which the unit operation of the connection destination has occurred immediately after the unit operation of the connection source has occurred to number of times which a unit operation of the certain connection source has occurred. For example, the "unit operation B" appears just after the "unit operation A" appeared, in the two service periods (the service period 1, and 3) of the four service period which appears the "unit operation A" in the time order 1, shown in FIG. 10. Therefore, the probability of transition from the "unit operation A" in the time order 1 to the "unit operation B" in the time order 2 becomes 2/4 (i.e., 0.5). Further, in another two service periods (the service periods 2, and 5), the probability of transition from the "unit operation A" in the time order 1 to the "unit operation C" in the time order 3 becomes 2/4 (i.e., 0.5), since the "unit operation C" appeared immediately after appearing the "unit operation A". It should be noted that, when there is no branch from the connection source, the transition probability is 1.0.

Incidentally, it is possible to generate the operation procedure to the operation sequence data in the one service period. However, since the operation procedure exists only one case in one service period, all transition probabilities is 1.0. The processing of the flowchart ends.

As described above, the event analysis apparatus 10 according to the first embodiment extracts the high abstract operation from past event log regarding the analysis target service to generate the operation procedure representing the flow of the actual operations. The event analysis apparatus 10 according to the present embodiment can generate the operation procedure reflecting the sequential characteristics or parallel characteristics between a plurality of operations or the branch of the operation depending on the external conditions. Thus, the user of the event analysis apparatus 10 can compare the operation procedure actually the DCS operator performed and the existing SOP, the event analyzer 10 can support for the improvement of the SOP. Further, when the SOP does not exist, the event analyzer 10 can create the SOP from the operation procedure, can support for creating a new SOP.

The event analysis apparatus 10 according to the present embodiment automatically generates the operation procedure based on the event log, thereby the user of the event analysis device 10 can easily grasp an "overall flow of the operation", a "sequential characteristics or parallel characteristics between the operations", and a "branch of the operation due to external conditions and difference of the operation depending on the DCS operator" with respect to the past specified services.

Thus, the event analysis apparatus 10 according to the first embodiment can estimate the operation procedure of the DCS operator to support the standardization of the operation.

Second Embodiment

Figure 11:
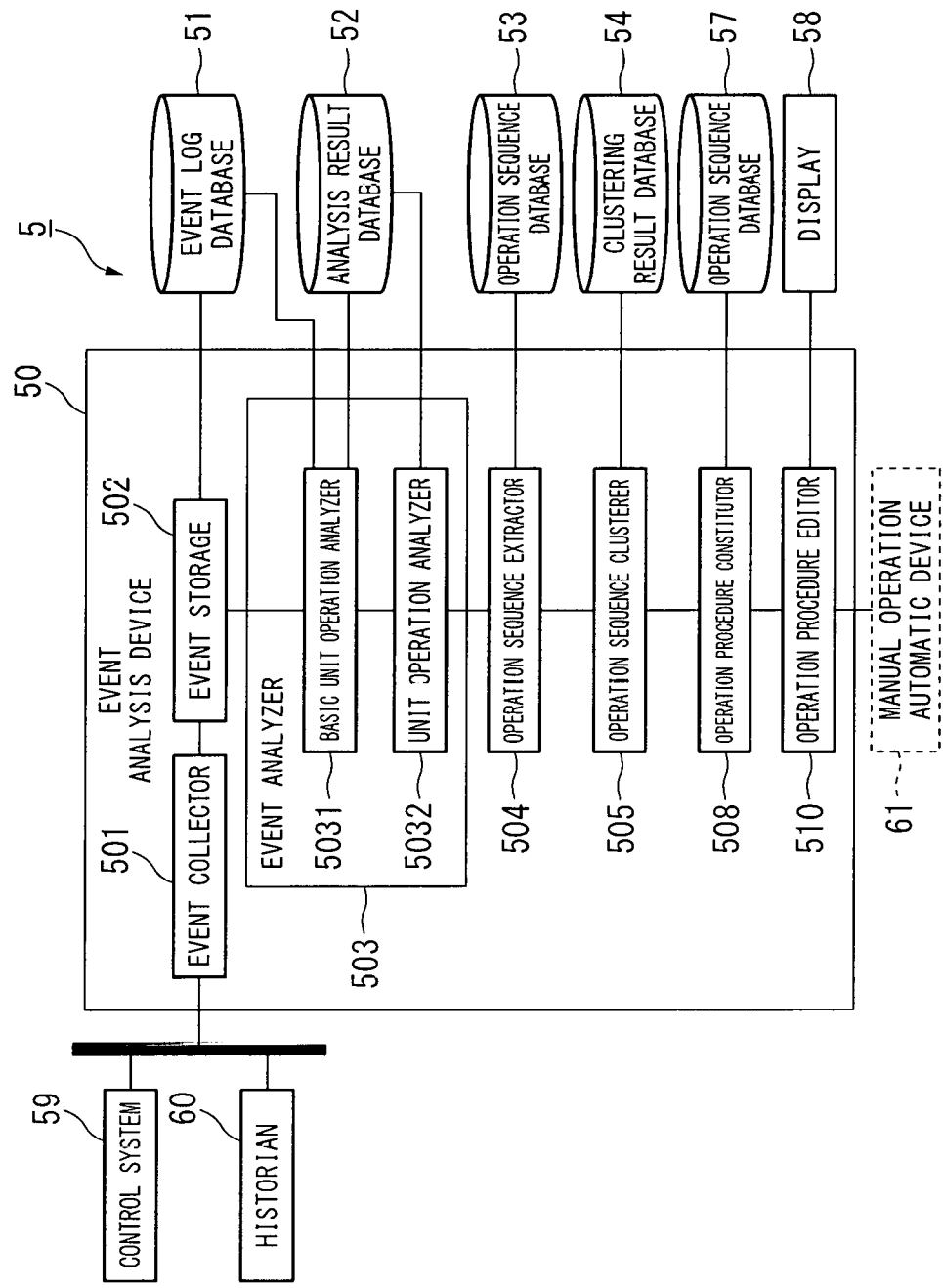
FIG. 11 is a block diagram showing a functional configuration of an event analysis system and the event analysis device according to a second embodiment of the present invention.

Next, a second embodiment of the present invention will be described with reference to the drawings. FIG. 11 is a block diagram showing a functional configuration of the event analysis system 5 and an event analysis device 50 according to the second embodiment of the present invention. Incidentally, the common portions (block of which the name is same) with the functional configuration providing the event analysis system 1 and the event analysis device 10 in the first embodiment, the description thereof is omitted.

As shown in FIG. 11, the event analysis system 5 according to the present embodiment includes a manual operation automation device 61. Further, the event analyzer 50 according to the present embodiment includes an operation procedure editor 510. The operation procedure editor 510 includes a function for editing to the operation procedure which the operation procedure generator 508. The operation procedure editor 510 includes a device for accepting an operation input from a user of the event analysis apparatus 50, such as a keyboard, a mouse or a touch panel. Thus, the event analyzer 50 can process the operation procedure automatically extracted by the operation procedure generator 508 using the operation procedure editor 510 based on human judgements.

Figure 12:
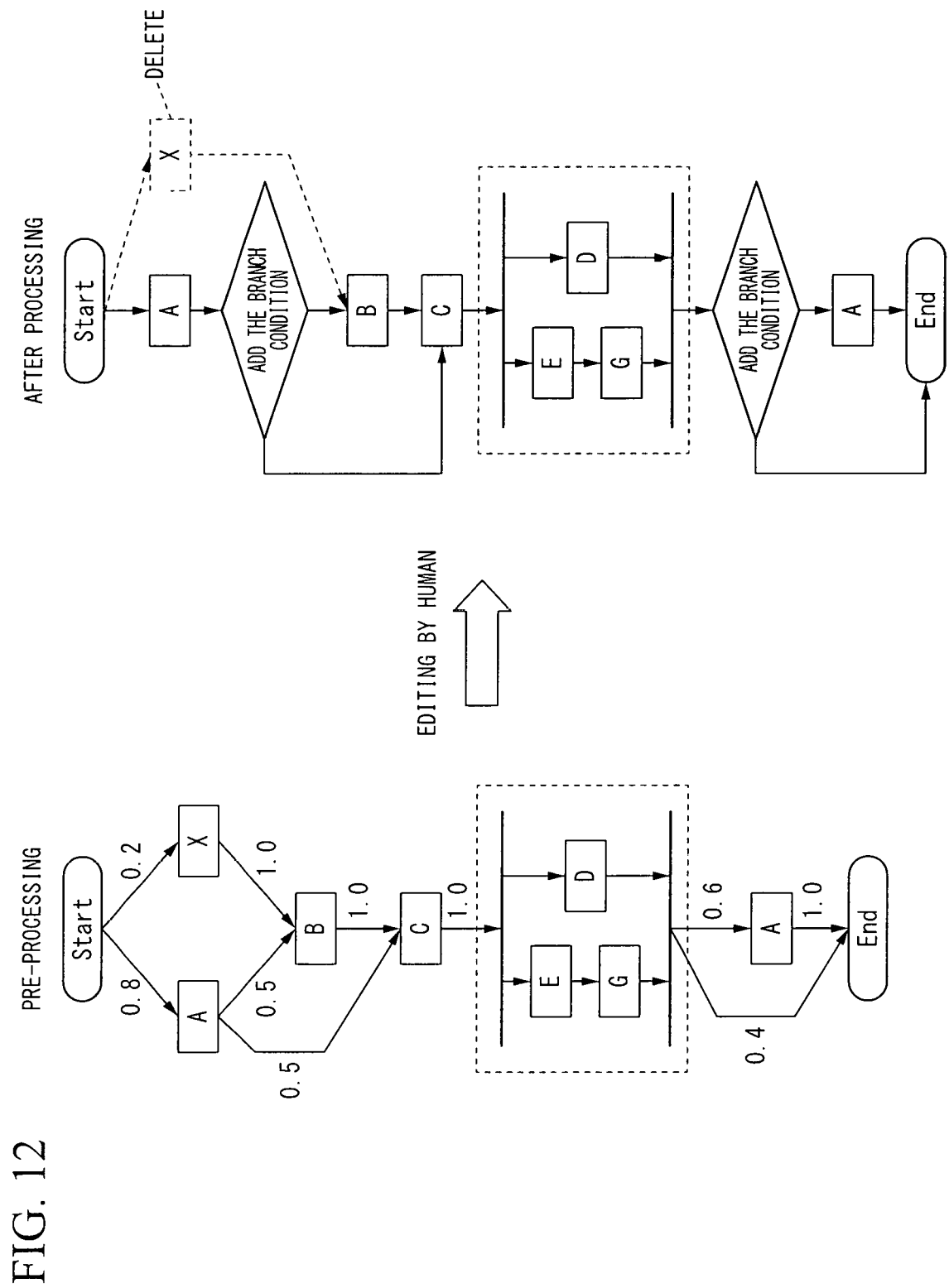
FIG. 12 is a diagram showing an example of the editing of the operation procedure according to the human judgment using the event analysis apparatus 50 according to the embodiment of the second embodiment of the present invention.
Figure 13:
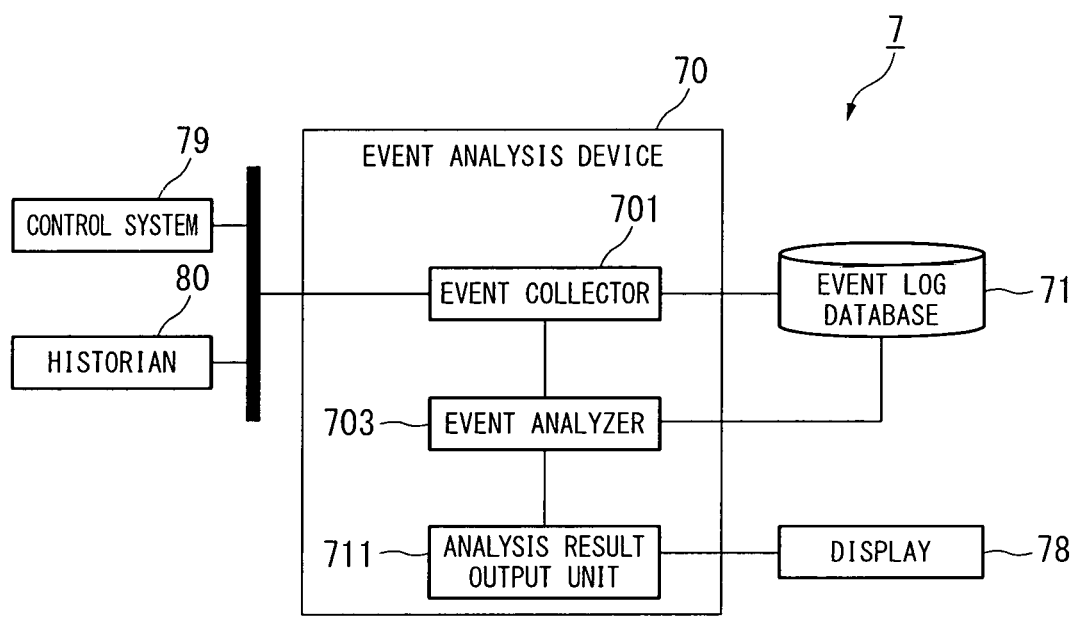
FIG. 13 is a block diagram showing the functional configuration of a prior event analysis system and an event analysis device.

FIG. 12 is a diagram showing an example of the editing of the operation procedure according to the human judgment using the event analysis apparatus 50 according to the embodiment of the second embodiment of the present invention. FIG. 12 shows two graphs representing the structure of the operation procedure on the left side and the right side. The graph on the left side is prior to be processed by the user of the event analysis apparatus 50, and the graph on the right side is a graph after being processed by the user of the event analysis apparatus 50.

For example, as shown in the graph (graph on the left) of "pre-processing" in FIG. 12, there exist branches of the case where "unit operation A" is performed and the case where "unit operation X" is performed. Further, after the "unit operation A" has been performed, there exists branches of "unit operation C" is performed after the "unit operation B" has been performed and the case where the "unit operation C" is performed is performed directly without performing the "unit operation B". Regarding the branch point, the user of the event analysis unit 50 determines whether the branch is appropriate to remove the inappropriate branch, further, adds the determination conditions to change to the form of the branch with the condition. For example, the graph (right graph) of the "after processing" in FIG. 12 represents the conditions that the branch immediately after the start of the service is deleted due to the user deletes the "unit operation X", and, the branch to the "unit operation B" or the "unit operation C" after the "unit operation A" is performed has been changed to the branch with the condition by the user.

The manual operation automation device 61 standardizes and automates the operation being performed manually by the DCS operator. The user of the event analysis apparatus 50 manually edits the operation procedure that has been automatically extracted by the event analyzer 50, thereby the event analysis device 50 creates a standard operation procedure of the flow chart format, and then the event analysis device 50 can provide the standard operation procedure to such the manual operation automation device 61 and the driving supporter (not shown).

Further, in a case that the operation sequence extractor 504 of the event analysis apparatus 50 according to the second embodiment provides a function to narrow down the event (e.g., the event of the high frequency operation) strongly associate with the service, the event analysis device 50 can extract the operation procedure performed most frequently from the plurality of specified service periods. The operation procedure generator 508, for example, respectively analyzes whole operation sequences extracted by the operation sequence extractor 504 and the operation sequences including the high frequency operation narrowed down by the operation sequence extractor 504. The event analysis device 50 or the user thereof compares the operation procedure of the high frequency operation (steady operation) and the operation procedure including the low frequency operation (extracted by relaxing the narrowing-down condition) (exception operation), thereby extracts the difference. It is possible to discover a different operating behavior from the normal time of the DCS operator. Thus, the event analyzer 50 may clarify the differences between the steady operation and the exception operation, it is possible to support the "awareness" of the operational improvements.

Although the embodiments of the present invention have been detailed described above, there is no restriction to the above-noted embodiment, and appropriate changes can be made within the scope of the invention.

Incidentally, it may also realize a part or all of the event analysis device 10 and the event analysis device 50 with a computer according to the embodiment described above. In that case, the program for realizing the control function may be realized by recording on a computer-readable recording medium, and installing the program recorded in the recording medium into a computer system, and executing the program. Further, the computer system may read and execute the program recorded in the cloud.

The computer system may be a computer system incorporated in the event analysis device 10 and the event analysis device 50, and may include hardware such as an OS and peripheral devices. In addition, the computer-readable recording medium refers to a flexible disk, a magneto-optical disk, a ROM, a portable medium such as a CD-ROM, and a memory such as a hard disk incorporated in the computer system.

Even more, the computer-readable recording medium may include a medium which holds the program dynamically and in short time, such as a communication circuit used in the case of transmitting a program via a communication circuit such as a network or a telephone circuit such as the Internet. Further, the computer-readable recording medium may include a medium which holds the program in predetermined time such as a volatile memory inside the computer system serving as a server or a client. Furthermore, the program may implement a part of the above functions. Moreover, the program may implement the above described functions in combination with previously recorded programs in the computer system.

The event analysis device 10 and the event analysis device 50 in the embodiment described above may be realized as an integrated circuit such as the LSI (Large Scale Integration). Each functional block of the event analysis device 10 and the event analysis device 50 may individually be a processor. Each functional block of the event analysis device 10 and the event analysis device 20 may be a processor by being integrated part or whole thereof. In addition, the method of circuit integration may be realized by a dedicated circuit or a general-purpose processor, not limited to the LSI. Further, if the integrated circuit technology replacing the LSI appears by advancing the semiconductor technology, the integrated circuit according to the technology may be used.

What is claimed is:

1. An event analysis device comprising:
at least one memory storing instructions, and
at least one processor configured to execute the instructions to:
collect event log data during a plurality of service periods, the event log data representing an operation history of an operation performed on a distributed control system by a distributed control system (DCS) operator;
extract one or more basic unit operations from the event log data and extract one or more unit operations from the extracted one or more basic unit operations, the basic unit operation representing an operation method of the operation performed on the distributed control system by the DCS operator, the unit operation representing an intention of the operation performed on the distributed control system by the DCS operator;
extract one or more operation sequences in every service period, the operation sequence arranging the one or more unit operations in time order based on an operation time;
cluster the operation sequences based on similarity among the operation sequences extracted in every service period;
sort the operation sequences clustered in the same type in time order, extract the one or more unit operations configuring the operation sequences, estimate information regarding whether a relation between the one or more unit operations is sequential or parallel and information regarding an order of the one or more unit operations and a branch of the one or more unit operations, and generate an operation procedure; and
generate the illustration visualized the structure of the operation procedure based on kind of the unit operations, the time order, and the transition probability, and edit data representing the operation procedure based on an operation input by the DCS operator.

2. The event analysis device according to claim 1, wherein the at least one processor is further configured to execute the instructions to:
set determination rule based on domain knowledge of one or more plant operations; and
estimate the information regarding whether the relation between the one or more unit operations is sequential or parallel based on the determination rule.

3. The event analysis device according to claim 1, wherein the at least one processor is further configured to execute the instructions to:
align at least one or more of same types of the one or more unit operations included in the operation sequences mutually belong in same time order to a plurality of the operation sequences clustered in the same type, and estimate the information regarding the order among the one or more unit operations.

4. The event analysis device according to claim 3, wherein the at least one processor is further configured to execute the instructions to:
obtain a transition probability among the one or more unit operations in the time orders which are mutually different from each other based on a set of the one or more unit operations included in the operation sequences in the time order in every service period.

5. The event analysis device according to claim 4, wherein the at least one processor is further configured to execute the instructions to:
generate an illustration that expresses the structure of the operation procedure based on kind of or the unit operations, the time order, and the transition probability.

6. The event analysis device according to claim 1, wherein the at least one processor is further configured to execute the instructions to:
output data representing the edited operation procedure to a manual operation automation device which is configured to standardize an operation operated manually by the DCS operator to automate the operation.

7. The event analysis device according to claim 1, wherein the at least one processor is further configured to execute the instructions to:
extract and narrow down the operation sequences including the operation of higher frequency operation than a prescribed threshold to the extracted operation sequences; and
sort according to a time order respectively all together the operation sequences extracted and the operation sequences narrowed down.

8. The event analysis device according to claim 5, wherein the at least one processor is further configured to execute the instructions to:
generate an illustration representing at least one of the operation procedure concerning the steady operation and the operation procedure concerning the exception operation based on the differences between the operation procedures in a plurality of operation procedure whose operation frequency is different from each other.

9. The event analysis device according to claim 1, wherein the at least one processor is further configured to execute the instructions to:
output the event log data representing the operation history of the operation by the DCS operator.

10. An event analysis method using a computer, comprising:
collecting event log data during a plurality of service periods, the event log data representing an operation history of an operation performed on a distributed control system by a distributed control system (DCS) operator;
extracting one or more basic unit operations from the event log data and extracting one or more unit operations from the extracted one or more basic unit operations, the basic unit operation representing an operation method of the operation performed on the distributed control system by the DCS operator, the unit operation representing an intention of the operation performed on the distributed control system by the DCS operator;
extracting one or more operation sequences in every service period, the operation sequence arranging the one or more unit operations in time order based on an operation time;
clustering the operation sequences based on similarity among the operation sequences extracted in every service period;
sorting the operation sequences clustered in the same type in time order, extracting the one or more unit operations configuring the operation sequences, estimating information regarding whether a relation between the one or more unit operations is sequential or parallel and information regarding an order of the one or more unit operations and a branch of the one or more unit operations, and generating an operation procedure; and
generating the illustration visualized the structure of the operation procedure based on kind of the unit operations, the time order, and the transition probability, and edit data representing the operation procedure based on an operation input by the DCS operator.

11. A non-transitory computer readable storage medium that stores a computer program for causing, when executed by a computer, the computer to perform:
collecting event log data during a plurality of service periods, the event log data representing an operation history of an operation performed on a distributed control system by a distributed control system (DCS) operator;
extracting one or more basic unit operations from the event log data and extracting one or more unit operations from the extracted one or more basic unit operations, the basic unit operation representing an operation method of the operation performed on the distributed control system by the DCS operator, the unit operation representing an intention of the operation performed on the distributed control system by the DCS operator;
extracting one or more of operation sequences in every service period, the operation sequence arranging the one or more unit operations in time order based on an operation time;
clustering the operation sequences based on similarity among the operation sequences extracted in every service period;
sorting the operation sequences clustered in the same type in time order, extracting the one or more unit operations configuring the operation sequences, estimating information regarding whether a relation between the one or more unit operations is sequential or parallel and information regarding an order of the one or more unit operations and a branch of the one or more unit operations, and generating an operation procedure; and generating the illustration visualized the structure of the operation procedure based on kind of the unit operations, the time order, and the transition probability, and edit data representing the operation procedure based on an operation input by the DCS operator.

12. The event analysis device according to claim 1, wherein the at least one processor is further configured to execute the instructions to:

extract the one or more unit operations from the extracted one or more basic unit operations based on a rule on the basis of domain knowledge of plant operation, the one or more unit operations indicating any operation of an increase, a decrease, a fine-tuning and an increase and decrease to a process value in the distributed control system.

* * * * *